June 14, 1960  D. M. McBEAN ET AL  2,940,587
ACCUMULATOR

Filed Nov. 25, 1957  2 Sheets-Sheet 1

INVENTORS.
DOUGLAS M. McBEAN
& LAURENCE C. TALLMAN
BY
Attorney

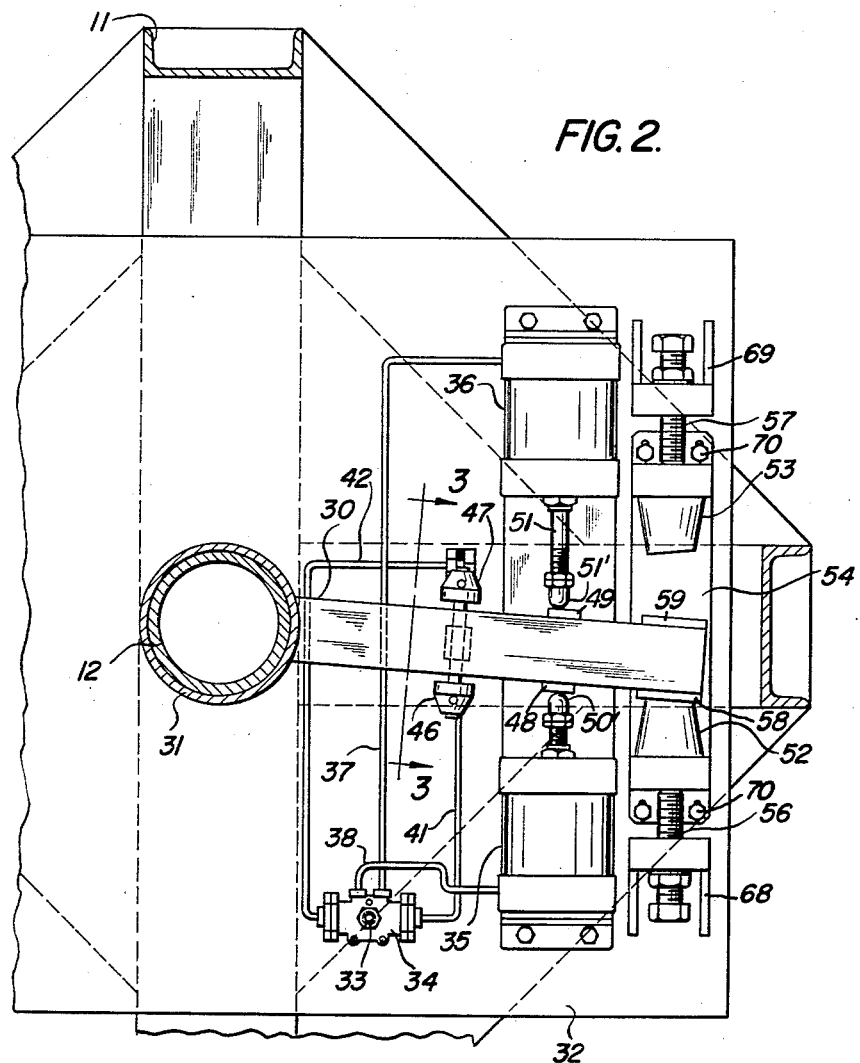
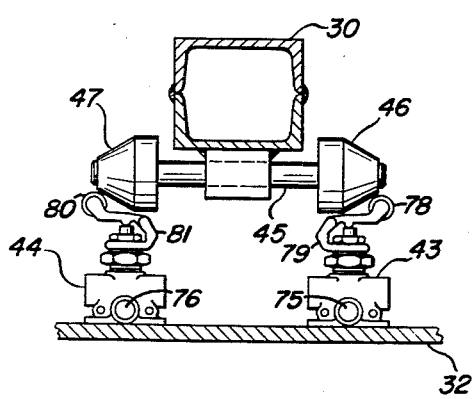
FIG. 2.
FIG. 3.
INVENTORS.
DOUGLAS M. McBEAN
& LAURENCE C. TALLMAN
BY
Attorney United States Patent Office 2,940,587
Patented June 14, 1960

2,940,587
ACCUMULATOR

Douglas M. McBean, East Rochester, and Laurence C. Tallman, Churchville, N.Y., assignors to Douglas M. McBean, Inc., East Rochester, N.Y., a corporation of New York Filed Nov. 25, 1957, Ser. No. 698,765

8 Claims. (Cl. 198—220)

This invention relates to a novel storage and conveyor mechanism.

In mass production assembly lines, where a series of operations are successively performed on an article, it frequently occurs that two successive operations are not well synchronized. The articles then accumulate between the two operations. For in-line sequential operations, in which, for example, an article may be submitted to several successive machining steps, breakdown of one tool, or the necessity of a temporary shutdown of one tool for sharpening, adjustments, or other cause, will cause a similar accumulation of articles between tools.

Usually, such an accumulation is stored temporarily in a bin or box. This is unsatisfactory for articles lacking in structural strength and apt to be damaged by the supported weight of a large number of like articles. Furthermore, where changes are made in production for any reason, it is necessary to use at least two bins or boxes, for otherwise old production may be found at inopportune times at the bottom of the storage receptacles. Moreover, the "first in, first out" system is best practice for such an accumulation, and is impossible where bins or boxes are used for storage. Storage of such articles on a flat shelf is the only simple and convenient way now available which permits free access to all stored articles regardless of the storage sequence.

An object of the present invention is to provide an improved storage device or accumulator occupying little floor space yet capable of storing large numbers of articles between operations.

Another object of the invention is to provide a novel conveyor and dispenser having an inclined surface over which automatic graduated movement of the articles may be effected in either direction.

A related object of the invention is to provide an accumulator with a loading and unloading surface at a convenient elevation, that is capable of automatically moving articles into a storage area in the accumulator, and that is capable of automatically returning the stored articles at a later time to the convenient unloading elevation and dispensing them at desired time intervals.

Another related object of the invention is to provide an accumulator of the class described in which the direction of travel of the articles can easily be reversed.

A further object of the invention is to provide a storage device for the successive accumulation of a plurality of articles in which all the articles are individually accessible.

Still another object of the invention is to provide an economical, convenient apparatus for the storage of stock between operations thereon, in which the stock will be neatly maintained, without damage, and without the necessity of resorting to conventional bins, boxes, and other receptacles.

In the illustrated embodiment of the invention, there is provided a framework supporting a vertical shaft mounted for free rotation therein and having a helical shelf or flight secured thereabout. Articles may be loaded at a convenient level on the shelf. The shaft is adapted to be oscillated by power-driven reciprocating pistons which actuate a jogging arm that is secured to the shaft. The pistons rock the jogging arm back and forth through a predetermined arc.

A bumper is located on each side of the jogging arm. The arm strikes one bumper at each end of its oscillating movement. The collision of the arm against each bumper arrests movement of the arm, the shaft, the shelf, and the articles on the shelf, the pistons are adjusted to operate to move the shelf at a high speed in one direction, and at a relatively low speed in the other direction. The collision that occurs at the end of the angular movement of the arm at high speed generates sufficient impact so that the inertia of the articles resting on the shelf carries them forward in their direction of movement before the collision. The collision that occurs at the other end, at low speed, does not generate sufficient impact to cause the articles to move, and they remain in place.

Controls are provided to permit selection of direction of the high velocity impact, and hence, the direction of movement of the articles. Regulation of the rate of movement of the high speed piston affords control over the distance travelled by the articles at each impact.

In the drawings:

Fig. 2 is a section taken on line 2—2 of Fig. 1, looking in the direction of the arrows;

Fig. 3 is a fragmentary section taken on the line 3—3 of Fig. 2, looking in the direction of the arrows.

Figure 1:
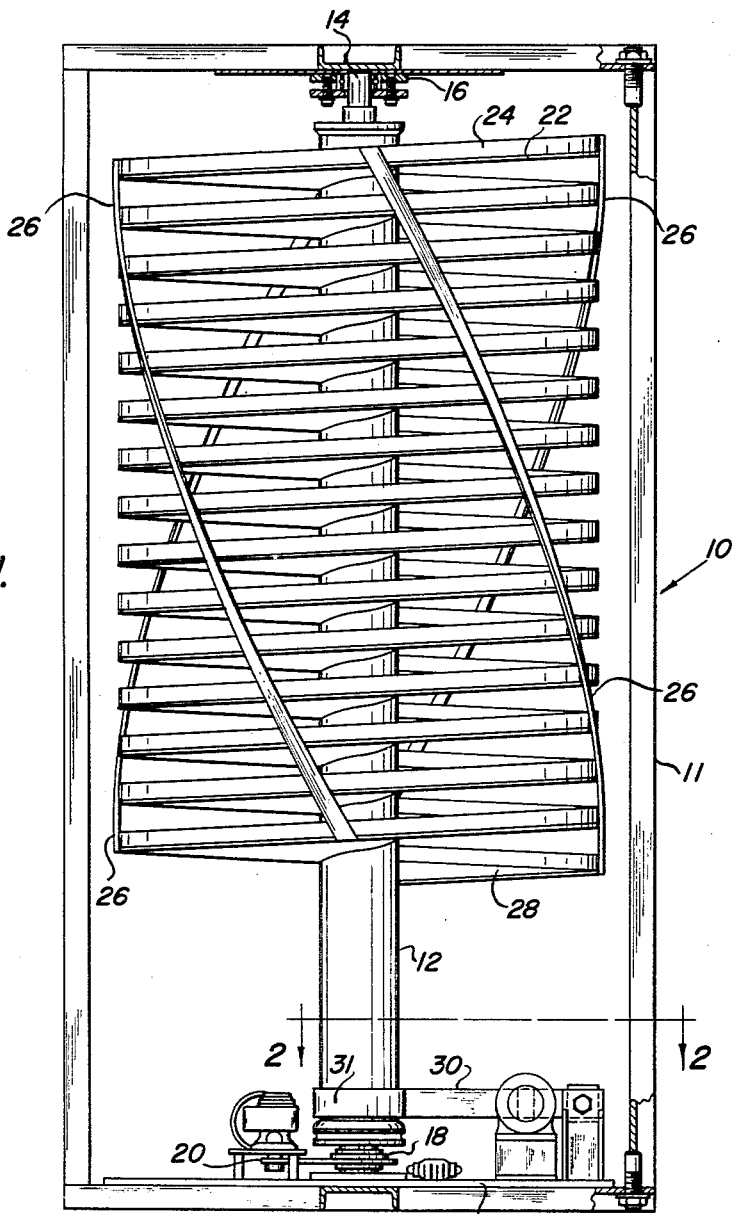
Fig. 1 is a part side elevational, part sectional, view showing an accumulator built according to one embodiment of this invention.

Referring now in detail to the drawings, the accumulator 10 includes a supporting frame 11 having a vertical shaft 12 rotatably mounted therein. The shaft 12 is provided at its upper end with a journal 14 of reduced size seated in a bearing 16 secured to the frame. At its lower end, the shaft is supported in a composite bearing 18 which provides thrust and radial support. This composite bearing is constantly rotated at a substantially uniform, slow speed by a synchronous motor acting through a chain and sprocket assembly 20, to avoid undue wear.

A helical, smooth-surfaced flight or shelf 22 is secured around the upper portion of the vertical shaft 12. A flight guard ribbon 24 is secured around the outer margin of the flight to hold articles on the flight. A series of curved stringers 26 are spaced around the periphery of the flight and are secured to successive levels of the flight to rigidify the structure. The lowermost portion 28 of the flight is disposed at a height affording convenient access thereto.

The drive mechanism for the accumulator includes a jogging arm 30 which is secured adjacent the bottom of the shaft 12. The arm 30 projects radially outward from the shaft 12, and is formed with a cylindrical portion 31 that is mounted around the lower portion of the shaft 12, and is welded thereto. As shown in Fig. 3, the arm 30 is formed from a pair of channel members whose flanges are welded together.

The drive mechanism that oscillates the jogging arm is mounted on a plate 32 that is part of the base of the accumulator frame. A source of compressed air or other fluid (not shown) is connected to the inlet port 33 of a four-way, air-operated master valve 34, that is mounted on the plate 32. The valve 34 is of a conventional type, containing a reciprocatory spool (not shown) that can be shifted from one end of the valve to the other to control the direction of air flow.

Figure 4:
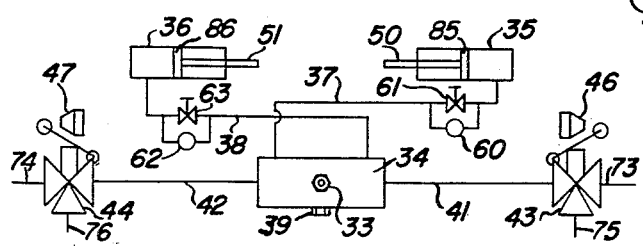
Fig. 4 is a schematic diagram of the control system for the accumulator.

A pair of opposing pneumatic cylinders 35, 36, are mounted on the plate 32, and are connected through lines 37, 38, respectively, to separate ports of the master valve 34. The valve 34 operates so that when one of the lines 37, 38 is on supply, the other is on exhaust. The valve has an exhaust port 39 (Fig. 4) through which air can exhaust to atmosphere. The master valve is also connected by lines 41, 42, respectively, with a pair of cam-operated valves 43, 44 (Figs. 3, 4). Through these lines the position and direction of movement of the spool of the valve 34 is controlled.

The valves 43, 44, are mounted on the plate 32. They are conventional three-way valves. Air is supplied to these valves from the compressed air supply source through the lines 73, 74 and is exhausted therefrom through the lines 75, 76 to atmosphere.

A rod 45 (Fig. 3), which is rigidly secured to the arm 30, to extend transversely of the arm, carries a pair of conical-shaped cams 46, 47, respectively, at its opposite ends. The cams 46, 47, are mounted on the rod 45 for axial adjustment thereon and are adapted to open the respective valves 43, 44, to connect the lines 41 and 42, respectively, to the air supply lines 73, 74, respectively, at the opposite limits of movement of the arm 30. The valves 43 and 44 are normally closed, to exhaust lines 41, 42, respectively, to atmosphere through lines 75, 76, respectively.

The piston rods 50, 51, of the pistons, which reciprocate in the opposed cylinders 35, 36, respectively, have adjustable rubber bumpers or caps 50', 51', respectively, thereon that are mounted to engage pads 48, 49 on opposite sides, respectively, of the jogging arm 30.

A pair of rubber bumpers 52, 53 are secured on a base plate 54 that is adjustably mounted on the plate 32. They are disposed on opposite sides of the jogging arm 30 to engage pads 58, 59 secured at opposite sides thereof. Adjusting bolts 56, 57, are adjustably threaded in brackets 68, 69, respectively, that are welded to the base plate 54. By means of these bolts the lateral position of the base plate 54 on the plate 32 can be adjusted. After adjustment, the brackets are secured in place by bolts 70 which pass through elongate slots in plate 54 and thread into base 32.

As shown in Fig. 4, each of the lines 37, 38, respectively, connects valve 34 and the associated cylinder 35 or 36, respectively, alternately through one or other of a pair of valves that are mounted in parallel. Thus, line 37 connects valve 34 with cylinder 35 alternately through a one-way valve 60 and a throttle valve 61; and similarly, cylinder 36 is connected with valve 34 by line 38 and either a one-way valve 62 or a throttle valve 63. The one-way valves 60, 62, respectively, are mounted to permit unobstructed flow of air from the cylinders 35, 36, respectively, through the respective lines 37, 38 to the master valve 34, during the discharge strokes of the pistons in the respective cylinders. The throttle valves 61, 63, can be regulated to adjust the rate of gas flow through the lines 37, 38, respectively, into the cylinders during the pressure strokes of the respective pistons.

To store articles on the flight 22, it is jogged repeatedly, thereby causing the articles to move in successive steps around the spiral flight. The direction of movement of the articles on the flight depends on the relative rates of movement of the flight in opposite directions. By oscillating the flight so that the jogging arm 30 moves with higher velocity in the counter-clockwise direction, as viewed in Fig. 2, a considerable impact is produced when the jogging arm 30 strikes against the rubber bumper 53; and the articles to be stored will be moved upwardly around the spiral flight 22. If a relatively low velocity is used in the clockwise direction, when the flight and the jogging arm 30 are returned, the jogging arm 30 will engage against the rubber bumper 52 with a sufficiently low velocity that the inertia of the articles on the flight 22 will be insufficient to cause their reverse movement.

To this end, the valve 61 is opened wide, to admit air rapidly to the cylinder 35, to cause the piston rod 50 to move the jogging arm 30 at a high velocity in a counter-clockwise direction; and the valve 63 in the line 38 is throttled down, to restrict the entry of compressed air to the cylinder 36, so the piston rod 51 associated with that cylinder will move the jogging arm 30 in a clockwise direction at a relatively low velocity. To this end, also, the bumper 50' is adjusted so that the associated piston reaches the end of its stroke in the cylinder 35 before the end of the jogging arm 30 engages against the rubber bumper 53. The opposite piston-rod bumper 51' is adjusted so that it engages the jogging arm 30 during the entire return movement of the arm 30. Thus, when the arm 30 is stopped by bumper 52, then, the inertia of the parts is not sufficient to carry them down the chute again.

Assuming that the parts are in the position shown in Fig. 2, and that compressed air is flowing to the master valve 34 through the inlet 33, and to the valves 43 and 44 through the inlets 73 and 74, the conical-shaped cam 46 will open the valve 43 momentarily. This will put the line 41 on supply, thereby shifting the spool of the master valve 34 to permit flow of compressed air from the master valve through the line 37 and its throttling valve 61, into the blind end of the cylinder 35. This causes the piston 85 and the adjustable bumper 50 to drive the jogging arm to rotate the shaft 12 in a counter-clockwise direction. As soon as the trip member 46 clears the roller 78 on the operating arm 79 of the valve 43, line 41 is put on exhaust through outlet 75.

After the piston 85 reaches the end of its stroke, the jogging arm 30 continues its movement in a counter-clockwise direction, until it strikes against the rubber bumper 53. The movement of the jogging arm 30, and of the shaft 12 and the flight 22, are thereby suddenly stopped, and the inertia of the articles on the flight 22 causes the articles to move along the surface of the flight, upwardly.

When the jogging arm 30 reaches the limit of its movement in the counter-clockwise direction, the conical shaped cam 47 strikes the roller 80 of the operating arm 81 of the valve 44, and opens that valve putting line 42 on supply from line 74 and shifting the spool of the master valve 34, to put the blind end of the cylinder 36 on supply from the line 38, and inlet 33, through the throttle valve 63, and to put the blind end of the cylinder 35 on exhaust through the valve 60, line 37 and outlet 39. Thus, the piston 86 and its adjustable bumper 51 are actuted, to drive the jogging arm 30, the shaft 12, and the flight 22 in a clockwise direction. As the jogging arm 30 moves back, clockwise in Fig. 2, the trip member 47 clears roller 80, and valve 44 closes to put line 44 on exhaust through outlet 76, and the piston bumper 50 is engaged, to return the piston 85 to its original position in the cylinder 35. At this time, air is exhausted from the cylinder 35 through the one-way valve 60, the line 37, and out the exhaust port 39 of the master valve 34.

The valve 63 is so adjusted relative to throttle valve 61 that the rate of return of the jogging arm 30 in the clockwise direction is relatively slow, compared to the movement of the jogging arm 30 in the counter-clockwise direction. Thus, the jogging arm 30 engages against the rubber bumper 52 at a low velocity, and with sufficiently low impact so that the inertia of the articles on the flight 22 is insufficient to overcome the friction that holds the articles on the surface of the flight.

When the jogging arm 30 returns to the limit of its movement in a clockwise direction, to engage against the rubber bumper 52, the conical-shaped cam 46 opens the valve 43 again, to again put line 41 on supply from inlet 73, thereby shifting the spool in the master valve 34. This again reverses the jogging arm, to move the jogging arm 30 in a counter-clockwise direction again.

This cycle goes on repeatedly until the apparatus is shut off. Thus, the number of articles, which can be stored on flight 22, is limited only by the capacity of the flight. If it is desired to remove the articles again from the accumulator, the direction of travel of the articles on the flight 22 can be reversed by proper adjustment of the throttle valves 61, 63; and proper adjustment of the adjustable piston bumpers 50, 51, and the rubber bumpers 52, 53.

As will be appreciated from the foregoing description, articles that are placed on the lowermost shelf area 28 of the flight 22 can be caused to move upwardly along the flight 22 by a series of successive, short movements; and the same articles can later be dispensed from the flight by adjusting the accumulator controls to cause the articles to move in a downward direction, by a similar series of short, successive movements.

The velocity attained by the jogging arm, the shaft 12, the flight 22, and the articles stored on the flight, determines the momentum of the articles, and hence determines the unit distance traveled by the articles at each impact. By proper regulation of the control valves 61 and 63, the velocity attained can be controlled to cause the articles to move over almost any selected distance at each impact.

While the preferred mode of operation of the device has been described above, it will be appreciated that the accumulator controls can be adjusted in other ways than those described. For example, the position of the cams 46, 47, can be adjusted on the rod 45, so that on the return stroke of the jogging arm, the spool of the master valve 34 is shifted before the jogging arm strikes against the rubber bumper 52, air is admitted to the cylinder 35 from the line 37, to actuate the piston 85 to drive the bumper 50 against the jogging arm before the jogging arm strikes the rubber bumper 52, so that the bumper 50 on the piston 85 cushions the movement of the jogging arm, and eases it through its change in direction with a minimum impact.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A device of the character described comprising a frame, an oscillatable shaft, a helically-disposed shelf secured around said shaft, a lever arm secured to said shaft and extending radially outwardly therefrom, power means mounted to oscillate said shaft through a predetermined arc at a greater velocity in one direction than in the other direction, impact means mounted on said frame in position to engage said arm at opposite ends of its oscillatory movement for arresting abruptly the angular movement of said arm and shaft at each extremity of said arc, whereby a greater impact occurs at one extremity of said arc than at the other, and control means positioned on said frame to be actuated by said arm in its oscillation to regulate the direction of movement of said shaft.

2. A device of the character described comprising a frame, an oscillatable shaft, a helically-disposed shelf secured around said shaft, a lever arm secured to said shaft and extending radially outward therefrom, fluid-operated power means mounted to oscillate said arm and shaft through a predetermined arc, means mounted on said frame at least at one extremity of said arc to engage said lever arm to arrest abruptly the movement of said arm and shaft, a pair of cams adjustably mounted on opposite sides of said lever arm, and a corresponding pair of cam-operated reversing valves mounted on said frame, each said valve being disposed for actuation by one of said cams to reverse said power means thereby to reverse the direction of movement of the shaft.

3. A device of the character described comprising a supporting frame, a vertical shaft oscillatably mounted in said frame, a helically-disposed shelf secured around said shaft, a lever arm affixed to said shaft and extending radially outward therefrom, fluid-operated power means mounted to oscillate said arm and shaft through a predetermined arc at a greater velocity in one direction than in the other direction, impact means mounted on said frame at each extremity of said arc to arrest the angular movement of said lever arm, whereby a greater impact occurs at one extremity of said arc than at the other, a pair of cams adjustably mounted on said arm on opposite sides thereof, a pair of cam-operated reversing valves mounted on said frame and controlling the direction of operation of said power means, each said valve being disposed for engagement with one of said cams to reverse said power means thereby to reverse the direction of movement of the shaft.

4. A device of the character described comprising a supporting frame, a vertical shaft rotatably mounted in said frame, a helically-disposed shelf secured around said shaft, a lever arm affixed to said shaft and extending radially outward therefrom, fluid-operated power means mounted to oscillate said lever arm and shaft through a predetermined arc at a greater velocity in one direction than in the other direction, a pair of bumpers disposed on said frame one on each side of said arm, said bumpers being disposed to engage said arm at the extremities of said arc, whereby a greater impact occurs at one extremity of said arc than at the other, a pair of cams mounted one on each side of said arm and for adjustment transversely of the axis of oscillation of said arm, a pair of cam-operated reversing valves mounted on said frame and controlling the direction of operation of said power means thereby controlling the direction of oscillation of said arm, each said valve being disposed for engagement with one of said cams to reverse said power means thereby to reverse the direction of movement of the shaft.

5. A device of the character described comprising a frame, an oscillatable shaft, a helically-disposed storage shelf secured around said shaft, a lever arm secured to said shaft and extending radially outwardly therefrom, means for oscillating said shaft through a predetermined arc including a pair of fluid-operated pistons mounted on said frame on opposite sides of said arm with their respective piston rods disposed for engagement with said arm intermediate the ends of said arm, said rods being adjustable in length to regulate the position of engagement of each said rod with said lever, means to actuate said pistons alternately, and impact means disposed on said frame to engage said arm radially outwardly of the point of engagement therewith of said pistons to arrest the movement of said lever abruptly at least at one extremity of said arc.

6. A device of the character described comprising a frame, a shaft oscillatably mounted on said frame, an inclined storage shelf secured around said shaft, a lever arm secured to said shaft and extending outwardly therefrom radially of the axis of said shaft, means for oscillating said shaft through a predetermined arc including a pair of fluid-operated pistons mounted on said frame on opposite sides of said arm with their respective piston rods disposed for engagement with said arm intermediate the ends of said arm, said rods being adjustable in length to regulate the position of operative engagement of each said rod with said arm, and means to actuate said pistons alternately, and a pair of bumpers mounted on said frame and disposed one on each side of said arm, said bumpers being disposed to engage said arm at the extremities of said arc and radially outwardly of the points of engagement of said pistons with said arm to arrest the movement of said arm and shaft, said bumpers being mounted on said frame for adjustment chordally of the arc of swing of said arm.

7. A device of the character described comprising a frame, a shaft oscillatably mounted in said frame, a helically-disposed storage shelf secured around said shaft, a lever arm secured to said shaft extending radially outwardly therefrom, means for oscillating said shaft through a predetermined arc including a pair of fluid-operated pistons mounted on said frame on opposite sides of said arm with their respective piston rods disposed for engagement with said arm intermediate the ends of said arm, said rods being adjustable in length to regulate the position of engagement of each said rod with said arm, and means to actuate said pistons alternately including a pair of cams mounted one on each side of said arm and for adjustment transversely of the axis of oscillation of said arm, and a pair of cam-operated valves mounted on said frame for controlling the direction of movement of said pistons, respectively, each said valve being disposed for engagement by one of said cams during swing of said arm and impact means mounted on said frame in position to engage said arm adjacent the free end thereof at one extremity of said arc to arrest the movement of said lever abruptly at said one extremity of oscillation of said arm.

8. A device of the character described comprising a frame, a vertical shaft oscillatably mounted in said frame, a helically-disposed storage shelf secured around said shaft, a lever arm secured to said shaft and extending radially outwardly therefrom, means for oscillating said shaft through a predetermined arc including a pair of fluid-operated pistons mounted on opposite sides of said arm with their respective piston rods disposed for engagement with said arm intermediate the ends of said arm, said rods being adjustable in length to regulate the position of engagement of each said rod with said arm as said arm oscillates, and means to actuate said pistons alternately and at a greater velocity in one direction than in the other direction including a pair of cams mounted one on each side of said arm for adjustment transversely of the axis of oscillation of said arm, and a pair of cam-operated valves mounted on said frame, each said valve being disposed for engagement by one of said cams, and a pair of bumpers disposed one on each side of said arm to engage said arm adjacent the free end of said arm at the extremities of said arc, to arrest the movement of said arm, whereby a greater impact occurs at one extremity of said arc than at the other, said bumpers being mounted for adjustment chordally of the arc of swing of said arm.

References Cited in the file of this patent

UNITED STATES PATENTS

| | | |
|---|---|---|
| 1,146,947 | Norton | July 10, 1915 |
| 1,204,522 | Wall | Nov. 14, 1916 |
| 2,818,968 | Carrier | Jan. 7, 1958 |

FOREIGN PATENTS

| | | |
|---|---|---|
| 168,160 | Great Britain | Sept. 1, 1921 |
| 781,733 | Great Britain | Aug. 21, 1957 |